United States Patent
Ko

(10) Patent No.: US 11,884,164 B2
(45) Date of Patent: Jan. 30, 2024

(54) SYSTEM AND METHOD FOR CONTROLLING CHARGING OF BATTERY OF ECO-FRIENDLY VEHICLE

(71) Applicants: Hyundai Motor Company, Seoul (KR); Kia Motors Corporation, Seoul (KR)

(72) Inventor: Kyu Beom Ko, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 407 days.

(21) Appl. No.: 16/665,112

(22) Filed: Oct. 28, 2019

(65) Prior Publication Data

US 2020/0339006 A1    Oct. 29, 2020

(30) Foreign Application Priority Data

Apr. 29, 2019 (KR) .......................... 10-2019-0049542

(51) Int. Cl.
| | |
|---|---|
| *B60L 3/00* | (2019.01) |
| *B60L 3/12* | (2006.01) |
| *B60L 58/12* | (2019.01) |
| *B60L 53/22* | (2019.01) |

(52) U.S. Cl.
CPC ............. *B60L 3/12* (2013.01); *B60L 53/22* (2019.02); *B60L 58/12* (2019.02)

(58) Field of Classification Search
None
See application file for complete search history.

(56) References Cited

U.S. PATENT DOCUMENTS

| | | | | |
|---|---|---|---|---|
| 2012/0256588 A1* | 10/2012 | Hayashi | ................. | B60L 53/14 320/109 |
| 2016/0036254 A1* | 2/2016 | Jeong | .................... | H02J 7/0029 320/137 |

FOREIGN PATENT DOCUMENTS

| | | |
|---|---|---|
| JP | 2012085458 A | 4/2012 |
| JP | 2012-228165 A | 11/2012 |
| KR | 20160007084 A | 1/2016 |

(Continued)

OTHER PUBLICATIONS

Office Action dated Dec. 8, 2023 in corresponding Korean Patent Application No. KR 10-2019-0049542.

*Primary Examiner* — Adam D Tissot
(74) *Attorney, Agent, or Firm* — Fox Rothschild LLP

(57) ABSTRACT

A system for controlling charging of a battery of an eco-friendly vehicle includes: an on-board charger (OBC) mounted in the vehicle, setting a required charging current based on available charging current information received from a power supply unit supplying power for charging the battery, transmitting the required charging current to the power supply unit, and converting the power supplied from the power supply unit to charge the battery; and a controller determining whether charging of the battery is completed, and when it is determined that charging of the battery is abnormally terminated in a state where charging is not completed, changing the required charging current to charge the battery based on first information supplied from the power supply unit upon abnormal termination of charging and based on second information supplied from the power supply unit upon normal completion of charging.

13 Claims, 3 Drawing Sheets

(56) References Cited

FOREIGN PATENT DOCUMENTS

| KR | 10-2016-0015613 A | 2/2016 |
|----|-------------------|--------|
| KR | 20170054970 A | 5/2017 |

* cited by examiner

FIG. 2

| First information(A) | 1 | 2 | 3 | 4 | ... | 10 |
|---|---|---|---|---|---|---|
| | 28 | 27 | 26 | 25 | ... | 19 |

| Second information(A) (decreasing order) | 1 | 2 | 3 | 4 | ... | 10 |
|---|---|---|---|---|---|---|
| | 31 | 29 | 28 | 26 | ... | |

SYSTEM AND METHOD FOR CONTROLLING CHARGING OF BATTERY OF ECO-FRIENDLY VEHICLE

CROSS REFERENCE TO RELATED APPLICATION

The present application claims under 35 U.S.C. § 119(a) the benefit of Korean Patent Application No. 10-2019-0049542, filed Apr. 29, 2019, the entire contents of which are incorporated by reference herein.

BACKGROUND

(a) Technical Field

The present disclosure relates generally to a system and a method for controlling charging of a battery of an eco-friendly vehicle, more particularly, to the system and method in which when charging of the battery is abnormally terminated, a charging current that is supplied from a power supply unit is automatically controlled, thus stably charging the battery.

(b) Description of the Related Art

In general, plug-in hybrid vehicles and electric vehicles, which are types of eco-friendly vehicles, include high-voltage batteries, driving motors powered by using the high-voltage batteries as power sources, and inverters for converting alternating current power into direct current power upon charging and discharging of the high-voltage batteries.

In particular, an eco-friendly vehicle is typically equipped with a separate on-board charger (OBC) that converts external power (for example, electric vehicle supply equipment (EVSE), household AC power) into chargeable DC power to generate a charging current for a high-voltage battery). Therefore, for driving the eco-friendly vehicle, electrical energy required for driving is delivered from the EVSE through the OBC and stored in the battery.

Meanwhile, the EVSE, which is installed in a charging station or the like, provides available charging current information (CP duty) to a vehicle while communicating with the OBC in the vehicle. In particular, the vehicle requests for a charging current from the EVSE based on the available charging current information of the EVSE. When the requested charging current is lower than an available charging current of the EVSE, charging is terminated. In the related art, when such a case occurs, a user sets the charging current to be low through an audio-video-navigation (AVN) system of the vehicle and attempts charging with a reset low current.

However, in the related art, when the user starts charging and then returns after stopping for a certain period of time, there are often cases where charging of a vehicle battery fails to be completed due to shortage of an available charging current of a distribution board. Additionally, when charging is terminated in this manner, the user must manually set a charging current. Therefore, in this case, when the user sets the charging current to be too high, charging may fail to be completed again, while when the user sets the charging current to be too low, charge time may increase.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a system and a method for controlling charging of a battery of a vehicle (e.g., an eco-friendly vehicle), in which when charging of the battery is abnormally terminated, a charging current that is supplied from a power supply unit is varied in intensity, thus realizing stable charging of the battery.

In order to achieve the above objective, according to one aspect of the present disclosure, there is provided a system for controlling charging of a battery of a vehicle (e.g., an eco-friendly vehicle), the system including: an on-board charger (OBC) mounted in the vehicle, setting a required charging current based on available charging current information received from a power supply unit supplying power for charging the battery, transmitting the required charging current to the power supply unit, and converting the power supplied from the power supply unit to charge the battery; and a controller determining whether charging of the battery is completed, and when it is determined that charging of the battery is abnormally terminated in a state where charging is not completed, changing the required charging current to charge the battery based on first information supplied from the power supply unit upon abnormal termination of charging and based on second information supplied from the power supply unit upon normal completion of charging.

The system may further include a storage unit storing the first information and the second information.

The controller may determine that charging of the battery is abnormally terminated when charging is terminated before a charging current output from the power supply unit reaches the required charging current requested by the OBC, or when charging is terminated without a user's request for terminating charging, or when charging is terminated before a predetermined target value set at a time of charge start is reached.

The predetermined target value set at the time of charge start may include a state of charge (SOC) and charge time of the battery.

When it is determined that charging of the battery is abnormally terminated, the controller compares an abnormal charging current, which is supplied from the power supply unit upon abnormal termination of charging, with a first normal charging current having a maximum intensity among the second information stored in the storage unit, and when the abnormal charging current is greater than the first normal charging current, the controller changes the required charging current to the first normal charging current to allow the battery to be charged.

When the abnormal charging current is equal to or less than the first normal charging current, the controller may compare the abnormal charging current with a second normal charging current having a value following the first normal charging current among multiple normal charging current values stored in the storage unit, and when the abnormal charging current is greater than the second normal charging current, the controller may change the required charging current to the second normal charging current to allow the battery to be charged.

When it is determined that charging of the battery is abnormally terminated, the controller may sequentially compare an abnormal charging current, which is supplied from the power supply unit upon abnormal termination of charging, with multiple normal charging current values stored in the storage unit from a highest value to a lowest value, and when the abnormal charging current is less than a nominal charging current having a minimum intensity, the controller terminates charging of the battery.

The controller compares expected charging power to be supplied from the power supply unit with expected power consumption to be consumed during charge time of the battery, and when the expected charging power is less than the expected power consumption, the controller may terminate charging of the battery.

When it is determined that charging of the battery is abnormally terminated, the controller updates the second information in the storage unit.

When charging of the battery is normally completed, the controller updates the first information in the storage unit.

According to another aspect of the present disclosure, there is provided a method for controlling charging of a battery of a vehicle (e.g., an eco-friendly vehicle), the method including: receiving, by an on-board charger (OBC), available charging current information from a power supply unit when a charge payment is made in a power supply unit; setting a required charging current based on the available charging current information received from the OBC and transmitting the required charging current to the power supply unit; and charging the battery by receiving the required charging current from the power supply unit.

The method may further include after charging the battery by receiving the required charging current from the power supply unit, when it is determined that charging of the battery is abnormally terminated in a state where charging is not completed, changing the required charging current to charge the battery based on first information supplied from the power supply unit upon abnormal termination of charging and based on second information supplied from the power supply unit upon normal completion of charging.

The method may further include before receiving the available charging current information from the power supply unit when the charge payment is made in the power supply unit, storing the first information and the second information.

In changing the required charging current to charge the battery, comparing an abnormal charging current supplied from the power supply unit upon abnormal termination of charging with a first normal charging current having a maximum intensity among the second information stored in a storage unit, and when the abnormal charging current is greater than the first normal charging current, changing the required charging current to the first normal charging current to allow the battery to be charged.

The method may further include when it is determined that charging of the battery is abnormally terminated, sequentially comparing an abnormal charging current, which is supplied from the power supply unit upon abnormal termination of charging, with multiple normal charging current values among the second information stored in a storage unit from a highest value to a lowest value, and when the abnormal charging current is less than a normal charging current having a minimum intensity, terminating charging of the battery.

The method may further include comparing expected charging power to be supplied from the power supply unit with expected power consumption to be consumed during charge time of the battery, and when the expected charging power is less than the expected power consumption, terminating charging of the battery.

The method may further include when it is determined that charging of the battery is abnormally terminated, allowing the first information to be updated in a storage unit.

The method may further include when charging of the battery is normally completed, allowing the second information to be updated in a storage unit.

According to the present disclosure, when charging of the battery is abnormally terminated, the charging current that is supplied from the power supply unit can be varied in intensity, thus realizing stable charging of the battery.

BRIEF DESCRIPTION OF THE DRAWINGS

The above and other objectives, features and other advantages of the present disclosure will be more clearly understood from the following detailed description when taken in conjunction with the accompanying drawings, in which:

FIG. 2 is a block diagram showing the system for controlling charging the battery of the eco-friendly vehicle according to the embodiment of the present disclosure, in which first information supplied from a power supply unit upon abnormal termination of charging the battery, and second information supplied from the power supply unit upon normal completion of charging the battery, are stored in a storage unit.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, exemplary embodiments of a system for controlling charging a battery of an eco-friendly vehicle according to an embodiment of the present disclosure will be described in detail with reference to the accompanying drawings.

Figure 1:
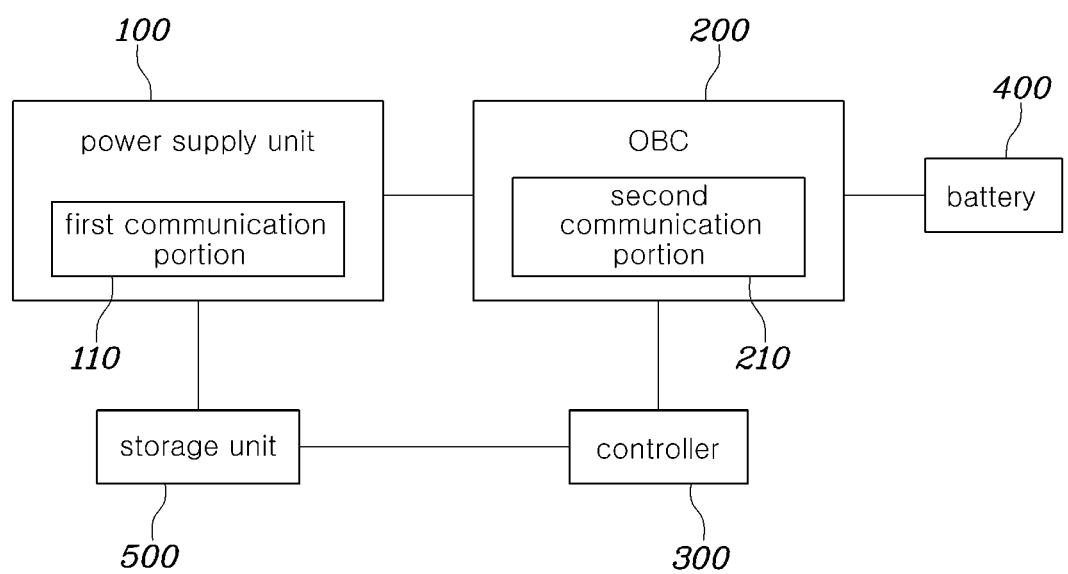
FIG. 1 is a view schematically showing an overall configuration of a system for controlling charging a battery of an eco-friendly vehicle according to an embodiment of the present disclosure.

FIG. 1 is a view schematically showing an overall configuration of a system for controlling charging of a battery of an eco-friendly vehicle according to an embodiment of the present disclosure, and FIG. 2 is a block diagram showing the system for controlling charging the battery of the eco-friendly vehicle according to the embodiment of the present disclosure, in which first information supplied from a power supply unit upon abnormal termination of charging the battery, and second information supplied from the power supply unit upon normal completion of charging the battery, are stored in a storage unit.

As shown in FIG. 1, the system for controlling charging of the battery of the eco-friendly vehicle according to the embodiment of the present disclosure may include a power supply unit 100, an on-board charger (OBC) 200, a controller 300, and a battery 400, and may further include a storage unit 500.

In particular, the power supply unit 100 supplies power for charging the battery 400 mounted in the vehicle and transmits available charging current information (CP duty) to the vehicle. In one embodiment, the power supply unit 100 according to the present disclosure may include an electric vehicle supply equipment (EVSE) installed in a distribution board, an electric vehicle charging station, and the like. The power supply unit 100 receives power from the distribution board and supplies the power to the vehicle through the EVSE.

Further, the power supply unit 100 may include a first communication portion 110. The power supply unit 100 transmits the available charging current information to the OBC 200 mounted in the vehicle through the first communication portion 110 and receives required charging current information from the OBC 200.

The OBC 200 is mounted in the vehicle and converts power that is supplied from the power supply unit 100 to charge the battery 400. Further, the OBC 200 may include a second communication portion 210 for communicating with the power supply unit 100. In particular, the OBC 200 receives the available charging current information from the power supply unit 100 through the second communication portion 210, sets a required charging current based on the received available charging current information, and transmits the required charging current information to the power supply unit 100.

Further, when the OBC 200 receives the required charging current that is supplied from the power supply unit 100, the OBC 200 supplies the required charging current to the battery 400 to charge the battery 400.

Herein, in one embodiment, the first communication portion 110 included in the power supply unit 100 and the second communication portion 210 included in the OBC 200 may be implemented as communication modules or the like.

The storage unit 500 stores multiple pieces of first information that are supplied from the power supply unit 100 upon abnormal termination of charging the battery 400, and multiple pieces of second information that are supplied from the power supply unit 100 upon normal completion of charging the battery 400. Herein, the first information denotes a charging current that is supplied from the power supply unit 100 upon abnormal termination of charging the battery 400, and the second information denotes a charging current that is supplied from the power supply unit 100 upon normal completion of charging the battery 400.

In particular, as shown in FIG. 2, the storage unit 500 may store the multiple pieces of first information supplied from the power supply unit 100 upon abnormal termination of charging the battery 400 in decreasing order and may store the multiple pieces of second information supplied from the power supply unit 100 upon normal completion of charging the battery 400 in decreasing order. The pieces of first information and second information stored in the storage unit 400 in descending order may be used when charging of the battery 400 is abnormally terminated and thus the controller 300 changes the required charging current.

Further, in the storage unit 500, charging current information that is supplied from the power supply unit 100 upon abnormal termination or normal completion of charging the battery 400 is updated.

The controller 300 determines whether charging of the battery 400 is completed. Herein, the controller 300 determines whether the battery 400 is in a fully-charged state based on a target state of charge (SOC) and charge time of the battery 400 that are set at the time of charging.

Further, when it is determined that charging of the battery 400 is abnormally terminated in a state where charging of the battery 400 is not completed, the controller 300 changes the required charging current to charge the battery 400 based on multiple pieces of first information supplied from the power supply unit 100 upon abnormal termination of charging and based on multiple pieces of second information supplied from the power supply unit upon normal completion of charging and pre-stored in the storage unit 500.

Herein, the controller 300 determines that charging of the battery 400 is abnormally terminated when charging is terminated before the charging current output from the power supply unit 100 reaches the required charging current requested by the OBC 200, or when charging is terminated without a user's request for terminating charging, or when charging is terminated before a predetermined target value set at the time of charge start is reached. At this time, the predetermined target set at the time of charge start may include the SOC and charge time of the battery. The user's request for terminating charging may include a state where a charging termination signal is input by the user through a button or the like.

Meanwhile, when it is determined that charging of the battery 400 is abnormally terminated, the controller 300 compares the abnormal charging current, which is supplied from the power supply unit 100 upon abnormal termination of charging, with a first normal charging current having a maximum intensity among the second information stored in the storage unit 500. Then, when the abnormal charging current is greater than the first normal charging current, the controller 300 changes the required charging current to the first normal charging current to allow the battery 400 to be charged.

Further, when the abnormal charging current is equal to or less than the first normal charging current, the controller 300 compares the abnormal charging current with a second normal charging current having a value following the first normal charging current among multiple normal charging current values stored in the storage unit 500. Then, when the abnormal charging current is greater than the second normal charging current, the controller 300 changes the required charging current to the second normal charging current to allow the battery 400 to be charged.

Meanwhile, when it is determined that charging of the battery 400 is abnormally terminated, the controller 300 sequentially compares the abnormal charging current, which is supplied from the power supply unit 100 upon abnormal termination of charging, with the multiple normal charging current values stored in the storage unit 500 from a highest value to a lowest value. Then, when the abnormal charging current is less than a normal charging current having a minimum intensity, the controller 300 terminates charging of the battery 400.

Referring to FIG. 2, in one embodiment, when the controller 300 determines that charging of the battery 400 is abnormally terminated, and when the abnormal charging current supplied from the power supply unit 100 upon abnormal termination of charging is 28 A, the controller 300 may sequentially compare the abnormal charging current of 28 A with the multiple normal charging current values stored in the storage 500 from a maximum value of 31 A to the lowest value. Then, the controller 300 changes the required charging current to 26 A that is less than the abnormal charging current of 28 A, thus allowing the battery 400 to be recharged. When the abnormal charging current is less than the normal charging current having a minimum intensity among the multiple normal charging current values stored in the storage 500, the controller 300 may terminate charging of the battery 400.

Further, the controller 300 compares expected charging power to be supplied from the power supply unit 100 with expected power consumption to be consumed during charge time of the battery 400. Then, when the expected charging power is less than the expected power consumption, the controller 300 terminates charging of the battery 400. In one embodiment, in a state where the available charging current that can be supplied from the power supply unit 100 is 3 A, when expected charging power to be supplied while charging proceeds at 3 A for a predetermined period of time is less than expected power consumption to be consumed by operation of the battery, a power converter, and the like, the controller 400 may terminate charging of the battery 400.

Further, when it is determined that charging of the battery 400 is abnormally terminated, the controller 300 updates the second information in the storage unit 500. Further, when charging of the battery is normally completed, the controller 300 updates the first information in the storage unit 500.

Figure 3:
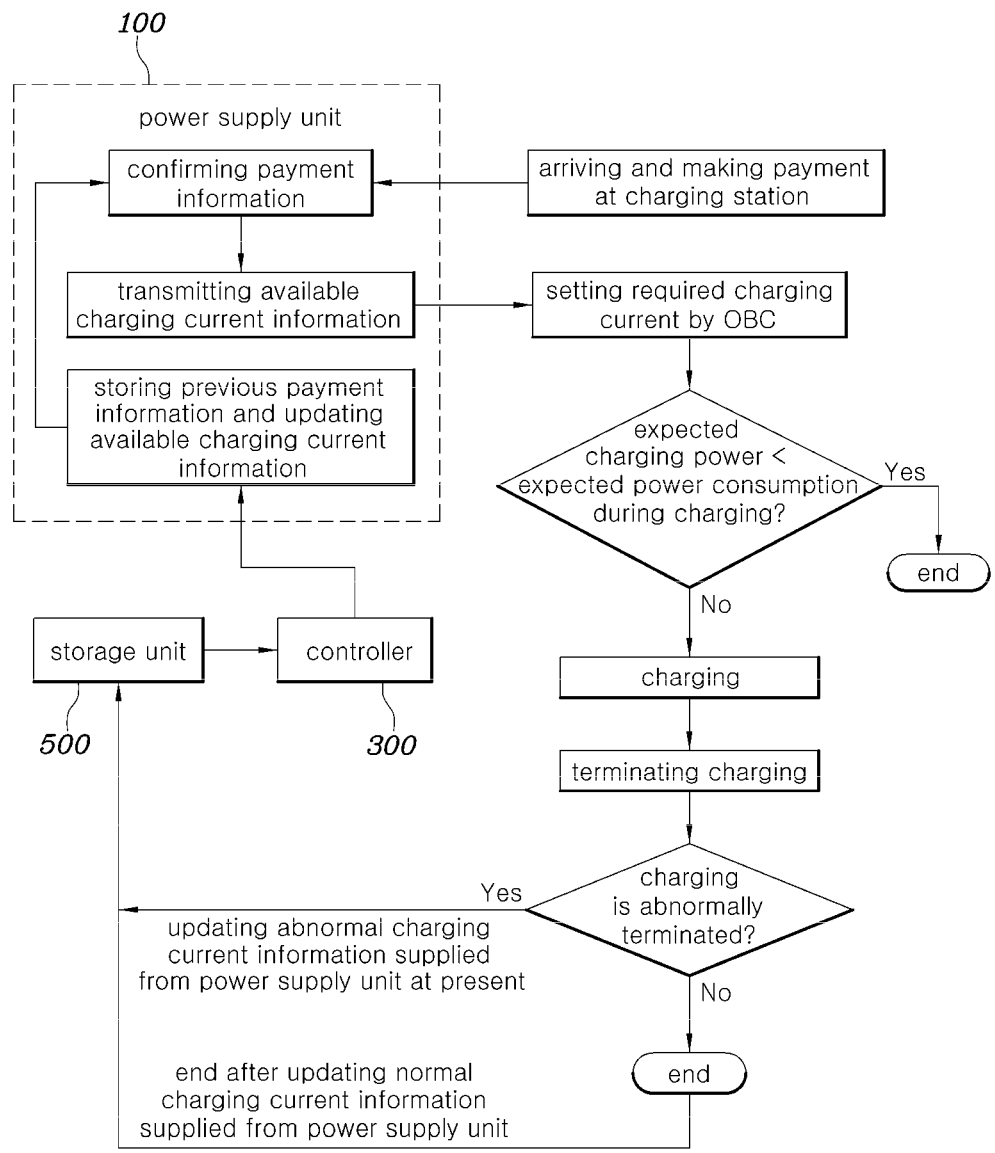
FIG. 3 is a flowchart showing a method for controlling charging of a battery of an eco-friendly vehicle according to an embodiment of the present disclosure.

FIG. 3 is a flowchart showing a method for controlling charging of a battery of an eco-friendly vehicle according to an embodiment of the present disclosure. In particular, the method for controlling charging the battery of the eco-friendly vehicle according to the embodiment of the present disclosure includes: receiving, by an on-board charger (OBC), available charging current information from a power supply unit when a charge payment is made in a power supply unit; setting a required charging current based on the available charging current information received from the OBC and transmitting the required charging current to the power supply unit; and charging the battery by receiving the required charging current from the power supply unit, and may further include, when it is determined that charging of the battery is abnormally terminated in a state where charging is not completed, changing the required charging current to charge the battery based on first information supplied from the power supply unit upon abnormal termination of charging and based on second information supplied from the power supply unit upon normal completion of charging.

In particular, in changing the required charging current to charge the battery, an abnormal charging current supplied from the power supply unit upon abnormal termination of charging is compared with a first normal charging current having a maximum intensity among the second information stored in a storage unit. Then, when the abnormal charging current is greater than the first normal charging current, the required charging current is changed to the first normal charging current to allow the battery to be charged.

Meanwhile, the method for controlling charging of the battery of the eco-friendly vehicle according to the present disclosure may further include, when it is determined that charging of the battery is abnormally terminated, sequentially comparing an abnormal charging current, which is supplied from the power supply unit upon abnormal termination of charging, with multiple normal charging current values among the second information stored in a storage unit from the highest value to the lowest value, and when the abnormal charging current is less than a normal charging current having a minimum intensity, terminating charging of the battery.

The method may further include comparing expected charging power to be supplied from the power supply unit with expected power consumption to be consumed during charge time of the battery, and when the expected charging power is less than the expected power consumption, terminating charging of the battery.

The method may further include, when it is determined that charging of the battery is abnormally terminated, allowing the first information to be updated in a storage unit.

The method may further include, when charging of the battery is normally completed, allowing the second information to be updated in a storage unit.

The detailed technical features of each step of the method for controlling charging the battery of the eco-friendly vehicle according to the embodiment of the present disclosure remain the same as the technical features of the system for controlling charging the battery of the eco-friendly vehicle according to the embodiment of the present disclosure described above, and thus a detailed description thereof will be omitted herein.

Although the exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A system for controlling charging of a battery of a vehicle, the system comprising:
   an on-board charger (OBC) mounted in the vehicle, setting a required charging current based on available charging current information received from a power supply unit supplying power for charging the battery, transmitting the required charging current to the power supply unit, and converting the power supplied from the power supply unit to charge the battery, wherein the power supply unit is installed outside of the vehicle;
a controller determining whether charging of the battery is completed, and when it is determined that charging of the battery is abnormally terminated in a state where charging is not completed, changing the required charging current to charge the battery based on first information for charging current supplied from the power supply unit upon abnormal termination of charging and second information for charging current supplied from the power supply unit upon normal completion of charging, and
a storage unit storing the first information and the second information;
wherein the first information is supplied from the power supply unit upon abnormal termination of charging the battery in decreasing order;
wherein the second information is supplied "from the" power supply unit upon normal completion of charming the battery in decreasing order; and
wherein, when it is determined that charging of the battery is abnormally terminated, the controller compares an abnormal charging current, which is supplied from the power supply unit upon abnormal termination of charging, with a first normal charging current having a maximum intensity among the second information stored in the storage unit, and when the abnormal charging; current is greater than the first normal charging current, the controller changes the required charging current to the first normal charging current to allow the battery to be charged.

2. The system of claim 1, wherein the controller determines that charging of the battery is abnormally terminated when charging is terminated before a charging current output from the power supply unit reaches the required charging current requested by the OBC, or when charging is terminated without a user's request for terminating charging, or when charging is terminated before a predetermined target value set at a time of charge start is reached.

3. The system of claim 2, wherein the predetermined target value set at the time of charge start includes a state of charge (SOC) and charge time of the battery.

4. The system of claim 1, wherein when the abnormal charging current is equal to or less than the first normal charging current, the controller compares the abnormal charging current with a second normal charging current having a value following the first normal charging current among multiple normal charging current values stored in the storage unit, and when the abnormal charging current is greater than the second normal charging current, the controller changes the required charging current to the second normal charging current to allow the battery to be charged.

5. The system of claim 1, wherein when it is determined that charging of the battery is abnormally terminated, the controller sequentially compares an abnormal charging current, which is supplied from the power supply unit upon abnormal termination of charging, with multiple normal charging current values stored in the storage unit from a highest value to a lowest value, and when the abnormal charging current is less than a normal charging current having a minimum intensity, the controller terminates charging of the battery.

6. The system of claim 1, wherein the controller compares expected charging power to be supplied from the power supply unit with expected power consumption to be consumed during charge time of the battery, and when the expected charging power is less than the expected power consumption, the controller terminates charging of the battery.

7. The system of claim 1, wherein when it is determined that charging of the battery is abnormally terminated, the controller updates the first information in the storage unit.

8. The system of claim 1, wherein when charging of the battery is normally completed, the controller updates the second information in the storage unit.

9. A method for controlling charging of a battery of a vehicle, the method comprising:
storing, by a storage unit, a first information and a second information;
receiving, by an on-board charger (OBC), available charging current information from a power supply unit, wherein the power supply unit is installed outside of the vehicle;
setting a required charging current based on the available charging current information received from the OBC and transmitting the required charging current to the power supply unit;
charging the battery by receiving the required charging current from the power supply unit, and
when it is determined that charging of the battery is abnormally terminated in a state where charging is not completed, charging the required charging current to charge the battery based on the first information for charging current supplied from the power supply unit upon abnormal termination of charging in decreasing order and based on the second information for charging current supplied from the power supply unit upon normal completion of charging in decreasing order,
wherein charging the required charging current to charge the battery includes;
comparing an abnormal charging current supplied from the power supply unit upon abnormal termination of charging with a first normal charging current having a maximum intensity among the second information stored in a storage unit, and
when the abnormal charging current is greater than the first normal charging current, changing the required charging current to the first normal charging current to allow the battery to be charged.

10. The method of claim 9, further comprising:
when it is determined that charging of the battery is abnormally terminated,
sequentially comparing an abnormal charging current, which is supplied from the power supply unit upon abnormal termination of charging, with multiple normal charging current values among the second information stored in a storage unit from a highest value to a lowest value, and when the abnormal charging current is less than a normal charging current having a minimum intensity, terminating charging of the battery.

11. The method of claim 9, further comprising:
comparing expected charging power to be supplied from the power supply unit with expected power consumption to be consumed during charge time of the battery, and when the expected charging power is less than the expected power consumption, terminating charging of the battery.

12. The method of claim 9, further comprising:
when it is determined that charging of the battery is abnormally terminated, allowing the first information to be updated in a storage unit.

13. The method of claim 9, further comprising:

when charging of the battery is normally completed, allowing the second information to be updated in a storage unit.

\* \* \* \* \*